(12) United States Patent
Murakami et al.

(10) Patent No.: US 11,961,989 B2
(45) Date of Patent: Apr. 16, 2024

(54) CONTROL METHOD FOR FUEL CELL SYSTEM

(71) Applicant: HONDA MOTOR CO., LTD., Tokyo (JP)

(72) Inventors: Yoshikazu Murakami, Saitama (JP); Shinji Matsunaga, Saitama (JP); Takashi Arai, Saitama (JP); Akiji Ando, Saitama (JP); Takashi Yanagiura, Tokyo (JP); Kazunori Yamamoto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 282 days.

(21) Appl. No.: 17/518,838

(22) Filed: Nov. 4, 2021

(65) Prior Publication Data

US 2022/0140424 A1     May 5, 2022

(30) Foreign Application Priority Data

Nov. 5, 2020    (JP) .................................. 2020-185443

(51) Int. Cl.
*H01M 16/00*      (2006.01)
*H01M 8/04082*    (2016.01)
(Continued)

(52) U.S. Cl.
CPC ..... *H01M 16/006* (2013.01); *H01M 8/04201* (2013.01); *H01M 8/04626* (2013.01);
(Continued)

(58) Field of Classification Search
CPC ........... H01M 8/04626; H01M 10/425; H01M 16/006; H01M 50/00
See application file for complete search history.

(56) References Cited

U.S. PATENT DOCUMENTS

2003/0155160 A1    8/2003   Nomura et al.
2004/0197611 A1*   10/2004   Niedzwiecki ..... H01M 8/04089
                                                          429/432

(Continued)

FOREIGN PATENT DOCUMENTS

CA          3008300 A1    12/2018
EP          0947376 A1    10/1999
(Continued)

OTHER PUBLICATIONS

Wu D, Ren J, Davies H, Shang J, Haas O. Intelligent Hydrogen Fuel Cell Range Extender for Battery Electric Vehicles. World Electric Vehicle Journal. 2019; 10(2):29. https://doi.org/10.3390/wevj10020029 (Year: 2019).*

(Continued)

*Primary Examiner* — Said Bouziane
(74) *Attorney, Agent, or Firm* — Paratus Law Group, PLLC

(57) ABSTRACT

A control method for a fuel cell system, the fuel cell system including a hydrogen storage part and a fuel cell stack that generates electric power using hydrogen supplied from the hydrogen storage part, the fuel cell system being mounted on a towed portion of a moving body that includes the towed portion and a towing portion, the fuel cell system being electrically connected to the towing portion, the towing portion including a battery and a drive device performing driving in response to supply of electric power, the towed portion being towed by the towing portion, the control method includes: acquiring remaining amount information indicating a remaining amount of the battery, and starting supply of electric power to the towing portion when it is determined that the remaining amount of the battery is equal to or less than a threshold based on the remaining amount information.

7 Claims, 16 Drawing Sheets

(51) Int. Cl.
*H01M 8/04537* (2016.01)
*H01M 8/04858* (2016.01)
*H01M 8/2475* (2016.01)

(52) U.S. Cl.
CPC ....... *H01M 8/0494* (2013.01); *H01M 8/2475* (2013.01); *H01M 2220/20* (2013.01); *H01M 2250/20* (2013.01)

(56) References Cited

U.S. PATENT DOCUMENTS

| | | |
|---|---|---|
| 2006/0144625 A1 | 7/2006 | Nomura et al. |
| 2012/0193153 A1 | 8/2012 | Wellborn et al. |
| 2013/0257145 A1* | 10/2013 | Caldeira ................ B60L 50/61 307/9.1 |
| 2018/0375135 A1 | 12/2018 | Kumada et al. |
| 2019/0006981 A1 | 1/2019 | Nada |

FOREIGN PATENT DOCUMENTS

| | | |
|---|---|---|
| JP | 2002-141078 A | 5/2002 |
| JP | 2003-317787 A | 11/2003 |
| JP | 2006-523373 A | 10/2006 |
| JP | WO2017/110390 A1 | 6/2017 |
| JP | 2019-009954 A | 1/2019 |
| KR | 10-2014-0031458 A | 3/2014 |
| KR | 10-2015-0137853 A | 12/2015 |
| WO | WO 2013/149135 A1 | 10/2013 |

OTHER PUBLICATIONS

Dec. 16, 2023, Translation of Chinese Office Action issued for related CN Application No. 202111297062.X.

* cited by examiner

FIG. 3
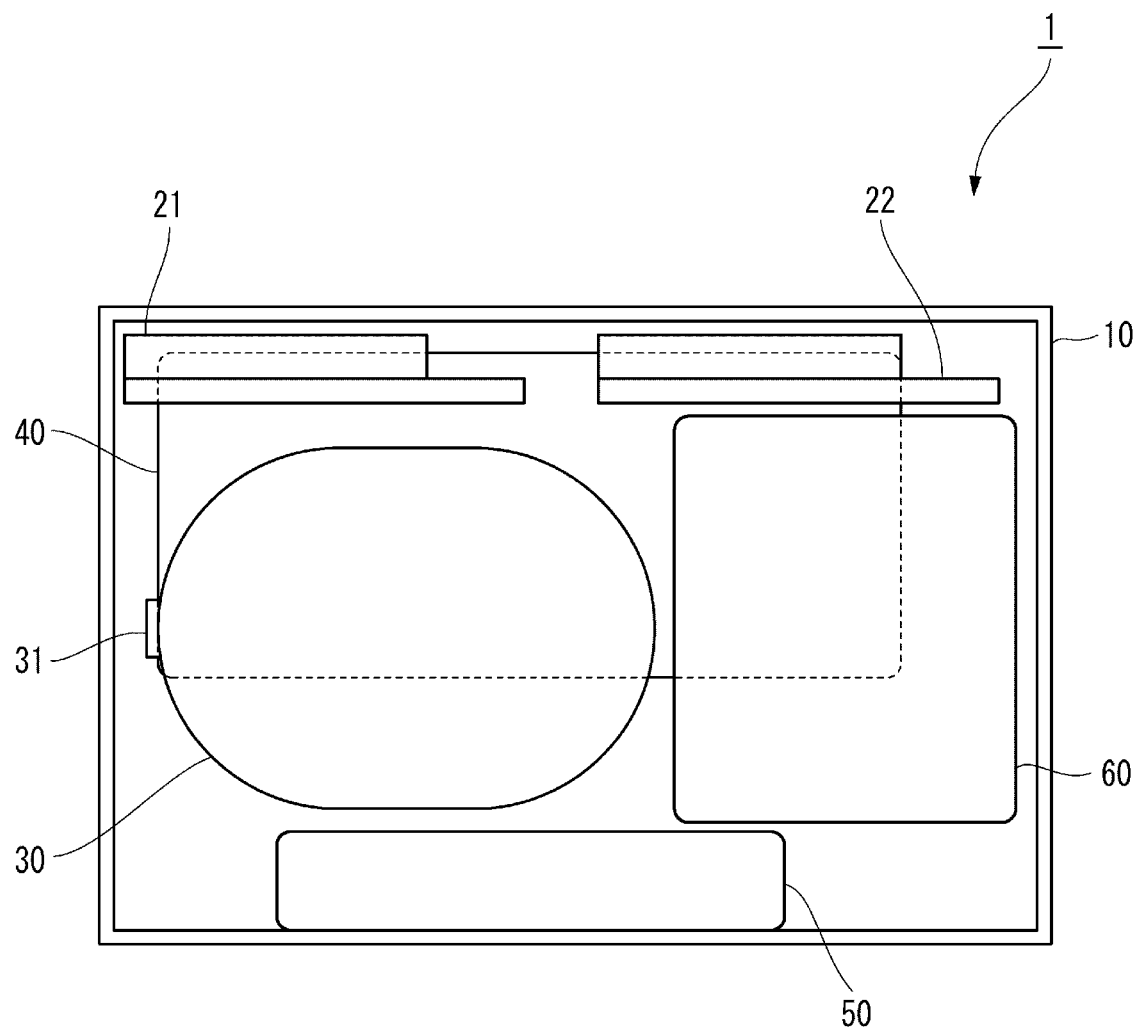
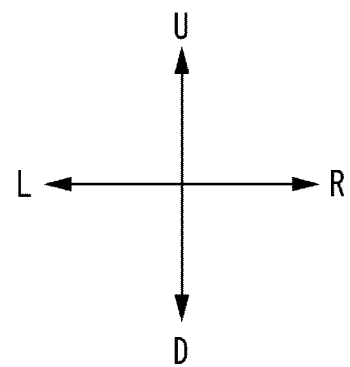

FIG. 4
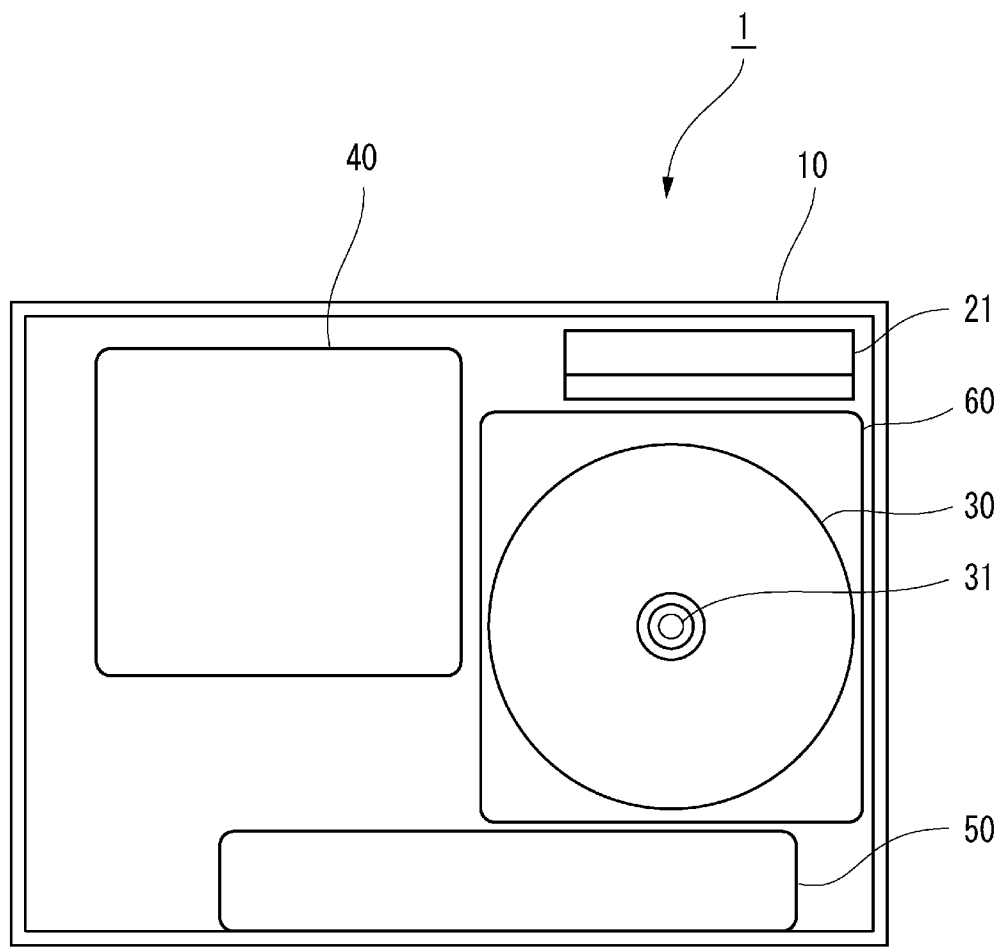
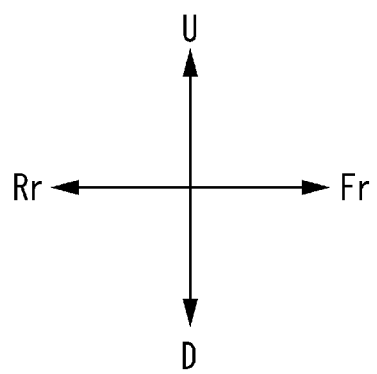

FIG. 5
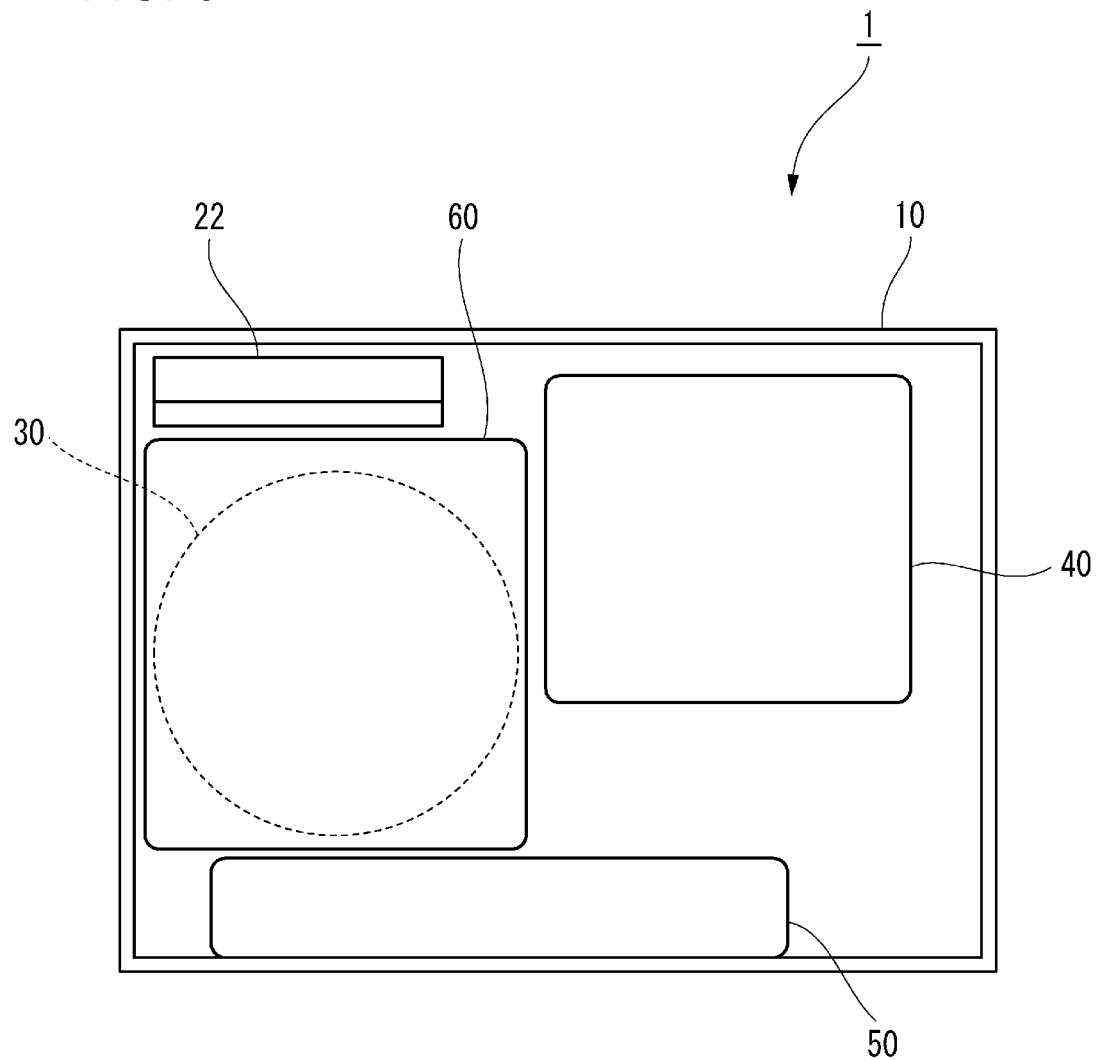
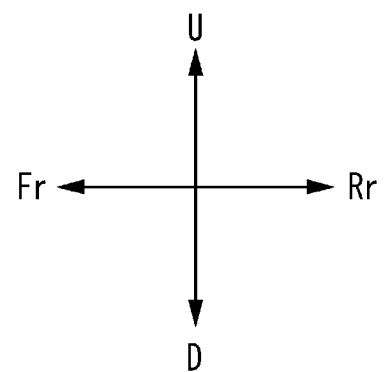

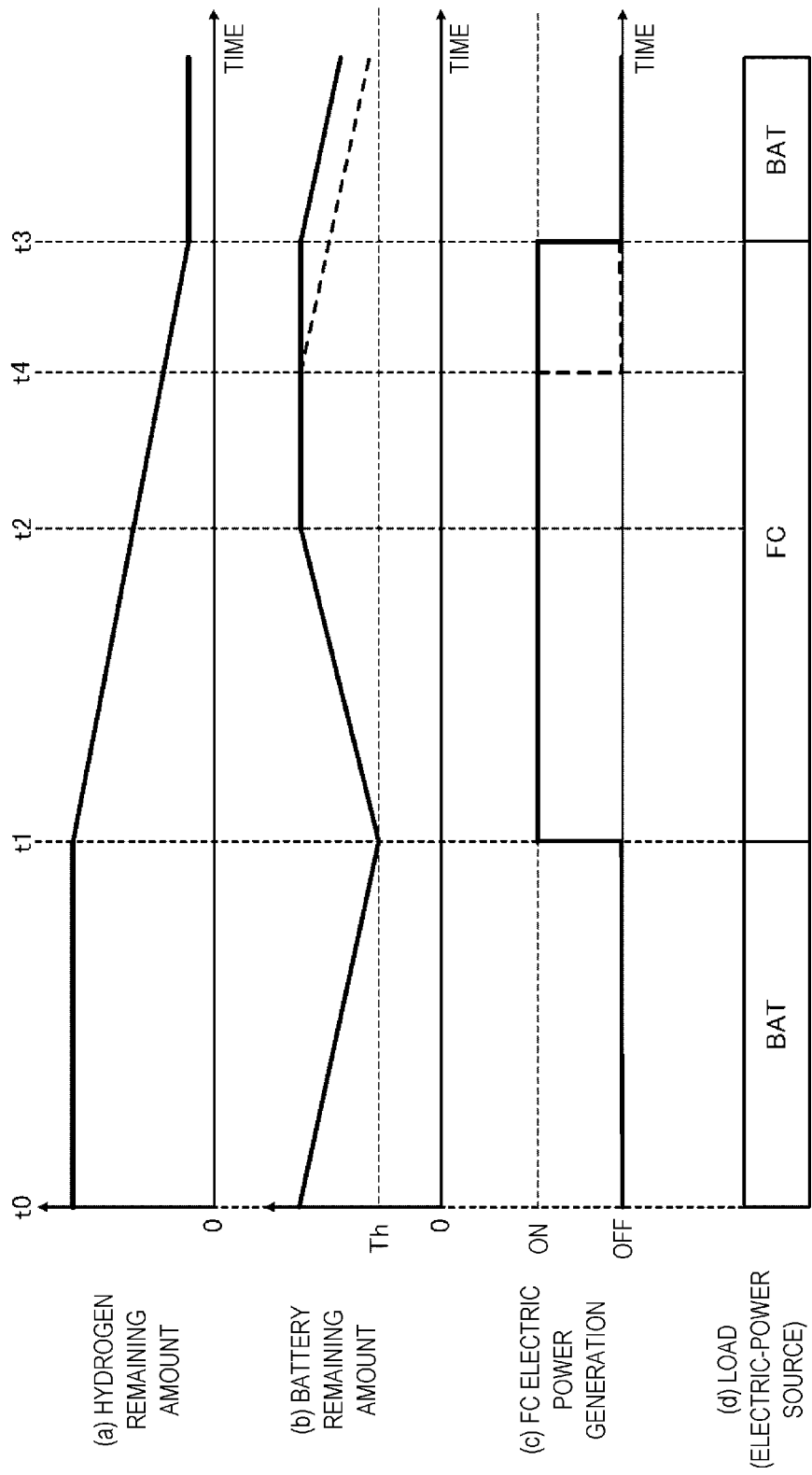

CONTROL METHOD FOR FUEL CELL SYSTEM

CROSS-REFERENCE TO RELATED APPLICATIONS

The present application claims the benefit of priority of Japanese Patent Application No. 2020-185443, filed on Nov. 5, 2020, the content of which is incorporated herein by reference.

TECHNICAL FIELD

The present invention relates to a control method for a fuel cell system.

BACKGROUND ART

In recent years, attention has been paid to fuel cell systems that have high energy efficiency and are environmentally friendly. A fuel cell system includes a hydrogen storage part that stores hydrogen, a fuel cell stack that generates electric power using hydrogen supplied from the hydrogen storage part, and an electric-power storage unit that stores electric power obtained by electric power generation performed by the fuel cell stack.

There is a technique in which such a fuel cell system is mounted on a vehicle, and electric power of the fuel cell system can be supplied to a drive motor of the vehicle or to an external electronic device or the like (for example, see JP-A-2002-141078). There is also a technique in which such a fuel cell system is mounted on a trailer or the like towed by a vehicle so as to be used as a movable power supply (for example, see JP-T-2006-523373 and JP-A-2003-317787).

With respect to a moving body that includes a towing portion and a towed portion, the towing portion including a battery and a drive device performing driving in response to supply of electric power, and the towed portion being towed by the towing portion, it is considered that, when a fuel cell system is mounted on the towed portion of the moving body and electric power of the fuel cell system can be appropriately supplied to the towing portion, convenience for a user of the towing portion (moving body) is improved.

SUMMARY

The present invention provides a control method for a fuel cell system, which is mounted on a towed portion of a moving body that includes the towed portion and a towing portion, capable of appropriately supplying electric power to the towing portion, the towing portion including a battery and a drive device performing driving in response to supply of electric power.

According to an aspect of the present invention, there is provided a control method for a fuel cell system, the fuel cell system including a hydrogen storage part that stores hydrogen and a fuel cell stack that generates electric power using hydrogen supplied from the hydrogen storage part, the fuel cell system at least being capable of supplying electric power obtained by electric power generation of the fuel cell stack to an outside, the fuel cell system being mounted on a towed portion of a moving body that includes the towed portion and a towing portion, the fuel cell system being electrically connected to the towing portion, the towing portion including a battery and a drive device performing driving in response to supply of electric power, the towed portion being towed by the towing portion, the control method including: acquiring remaining amount information indicating a remaining amount of the battery, and starting supply of electric power to the towing portion when it is determined that the remaining amount of the battery is equal to or less than a threshold based on the remaining amount information.

According to the present invention, it is possible to provide a control method for a fuel cell system, which is mounted on a towed portion of a moving body that includes the towed portion and a towing portion, capable of appropriately supplying electric power to the towing portion, the towing portion including a battery and a drive device performing driving in response to supply of electric power, and the towed portion being towed by the towing portion.

BRIEF DESCRIPTION OF THE DRAWINGS

FIG. 3 is a perspective view of the fuel cell system and the housing of FIG. 1 as viewed through the contents thereof from a front side.

FIG. 4 is a perspective view of the fuel cell system and the housing of FIG. 1 as viewed through the contents thereof from a left side.

FIG. 5 is a perspective view of the fuel cell system and the housing of FIG. 1 as viewed through the contents thereof from a right side.

FIG. 13 is a timing chart illustrating a specific example of supply of electric power by the fuel cell system according to the present embodiment.

DESCRIPTION OF EMBODIMENTS

Figure 1:
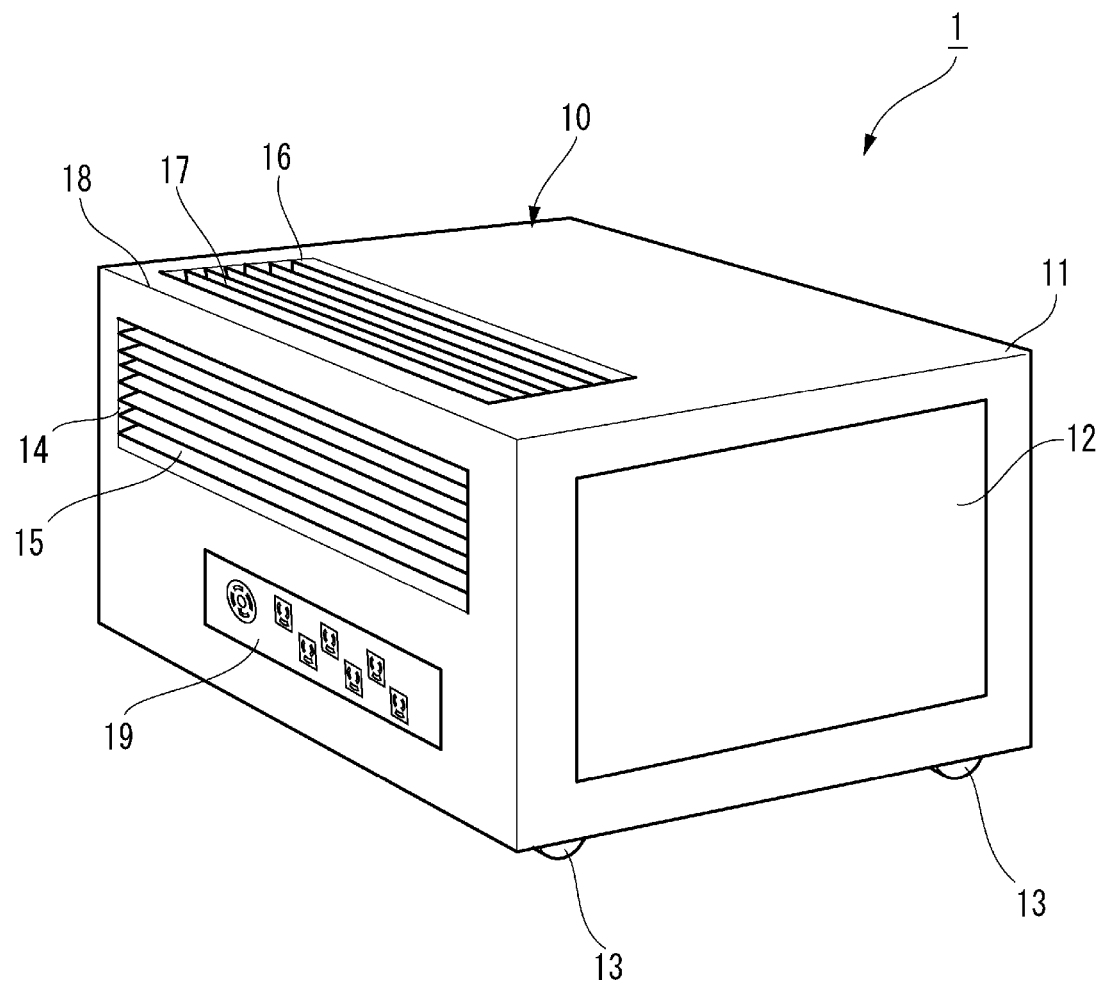
FIG. 1 is a perspective view of a fuel cell system and a housing according to an embodiment.
Figure 2:
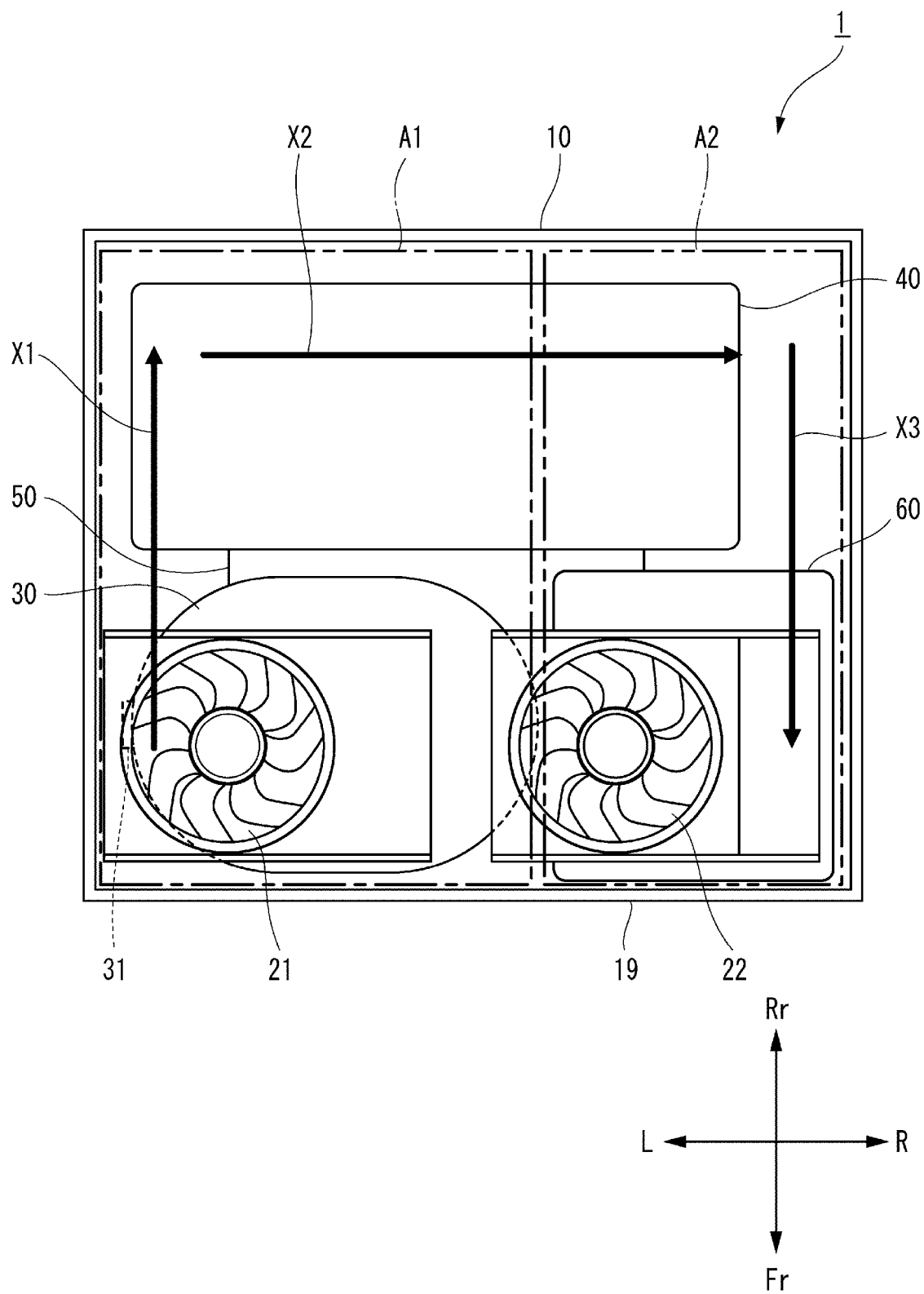
FIG. 2 is a perspective view of the fuel cell system and the housing of FIG. 1 as viewed through contents thereof from an upper side.

Hereinafter, an embodiment of the present invention will be described with reference to the accompanying drawings. In the present specification and the like, in order to simplify and clarify the description, a front-rear direction, a left-right direction, and an up-down direction are described in accordance with directions viewed from a user of a fuel cell system of the present embodiment. In the drawings, a front side of a housing accommodating the fuel cell system is denoted by Fr, a rear side thereof is denoted by Rr, a left side thereof is denoted by L, a right side thereof is denoted by R, an upper side thereof is denoted by U, and a lower side thereof is denoted by D.

As illustrated in FIG. 1, a fuel cell system 1 of the present embodiment is a device capable of generating electric power using hydrogen as an electric power generation energy source, and includes a housing 10. The housing 10 defines an outer shape of the fuel cell system 1, and accommodates various components and units (for example, a fuel cell stack 40 to be described later) provided in the fuel cell system 1.

The housing 10 includes: a box-shaped main body 11 that is made of resin or the like and provided with opening portions (not shown) on a left side surface portion and a right side surface portion; a lid portion 12 that covers the opening portions of the left side surface portion and the right side surface portion of the main body 11; and casters 13 that are provided on a lower surface portion of the main body 11. In a front surface portion (front side surface portion) and an upper surface portion of the main body 11, ventilation holes 14 and 16 that have a substantially rectangular shape extending in the left-right direction and allow air to flow inside and outside the housing 10 are formed.

For example, one of the ventilation holes 14 and 16 (for example, the ventilation hole 14) functions to take air outside the housing 10 to the inside of the housing 10, and the other ventilation hole (for example, the ventilation hole 16) functions to discharge air inside the housing 10 to the outside of the housing 10. With the ventilation holes 14 and 16, air permeability between the inside and the outside of the housing 10 can be secured, high-temperature air can be prevented from staying in the housing 10, and cooling of the fuel cell system 1 is achieved. In addition, since air permeability between the inside and the outside of the housing 10 is secured with the ventilation holes 14 and 16, even if hydrogen is generated inside the housing 10 due to some factor, the hydrogen can be quickly discharged to the outside of the housing 10.

The ventilation hole 14 is provided in the front surface portion of the main body 11, at a position corresponding to a side 18 connecting the front surface portion and the upper surface portion of the main body 11 (that is, the housing 10) so as to extend along the side 18. The ventilation hole 16 is provided in the upper surface portion of the main body 11, at a position corresponding to the side 18 so as to extend along the side 18. In other words, the side 18 is interposed between the ventilation hole 14 and the ventilation hole 16. Accordingly, as compared with a case where the ventilation hole 14 and the ventilation hole 16 are provided directly adjacent to each other, it is possible to secure the air permeability between the inside and the outside of the housing 10 while maintaining strength of the main body 11 (that is, the housing 10).

In addition, a plurality of louvers 15 and 17 parallel to each other are provided in the ventilation holes 14 and 16 along a longitudinal direction (that is, the left-right direction) of the ventilation holes 14 and 16. The louvers 15 and 17 can be configured such that, for example, air or the like discharged from the ventilation hole on an exhaust side (for example, the ventilation hole 16) among the ventilation holes 14 and 16 is less likely to flow into the ventilation hole on an intake side (for example, the ventilation hole 14). With this configuration, it is possible to prevent the high-temperature air discharged to the outside of the housing 10 from being taken to the inside of the housing 10 again. In addition, with this configuration, it is possible to prevent hydrogen discharged to the outside of the housing 10 from being taken to the inside of the housing 10 again.

In addition, an input/output unit 19 used to output electric power of the fuel cell system 1 to the outside or input electric power from the outside to the fuel cell system 1 is provided below the ventilation hole 14 in the front surface portion of the main body 11. By providing the input/output unit 19 in the front surface portion of the main body 11 similarly to the ventilation hole 14, it is possible to secure both accessibility of the user to the input/output unit 19 and the air permeability of the ventilation hole 14.

That is, from the viewpoint of securing the air permeability of the ventilation hole 14, the fuel cell system 1 can be used in a state where a predetermined space is secured on the front surface side of the housing 10 (main body 11). Therefore, by providing the input/output unit 19 in the front surface portion of the main body 11 similarly to the ventilation hole 14, the user can easily access the input/output unit 19 through the space at the time of using the fuel cell system 1, and the fuel cell system 1 can be smoothly connected to an external device or the like. An example of the input/output unit 19 will be described later with reference to FIG. 6.

As illustrated in FIGS. 2 to 5, the fuel cell system 1 is configured by accommodating, in the housing 10, a hydrogen storage part 30 that has a hydrogen supply/discharge hole 31, the fuel cell stack 40 that generates electric power using hydrogen supplied from the hydrogen storage part 30, a pipe (not shown) that connects the hydrogen storage part 30 and the fuel cell stack 40, and an electric-power storage unit 50 that stores electric power generated by the fuel cell stack 40 or supplied from the outside.

The hydrogen storage part 30 is a tank or the like capable of storing hydrogen (for example, liquid hydrogen) supplied from the outside through the supply/discharge hole 31. The supply/discharge hole 31 is provided so as to protrude leftward from a center of a left side surface portion of the hydrogen storage part 30, and faces the lid portion 12, which covers the opening portion of the left side surface portion of the main body 11, in the left-right direction. Therefore, the user can access the supply/discharge hole 31 by removing the lid portion 12 covering the opening portion of the left side surface portion of the main body 11 from the main body 11, and can easily fill the hydrogen storage part 30 with hydrogen. The hydrogen stored in the hydrogen storage part 30 is supplied to the fuel cell stack 40 via the supply/discharge hole 31 and the above-described pipe having one end connected to the supply/discharge hole 31 and the other end connected to the fuel cell stack 40.

The hydrogen storage part 30 is disposed at a position overlapping the ventilation hole 16 in a top view of the housing 10, and is disposed at a position overlapping the ventilation hole 14 in a front view (that is, a side view from the front side) of the housing 10. Since the hydrogen storage part 30 is disposed in this manner, for example, at the time of filling the hydrogen storage part 30 with hydrogen, hydrogen released to the surroundings of the hydrogen storage part 30 (hereinafter, also referred to as released hydrogen) can be quickly discharged from the ventilation holes 14 and 16 to the outside of the housing 10. Therefore, it is possible to suppress the released hydrogen from staying in the housing 10 and flowing toward the electric-power storage unit 50, and it is possible to improve the safety of the fuel cell system 1.

In addition, since a configuration in which the released hydrogen is quickly discharged to the outside of the housing 10 is adopted, when a hydrogen detector (not shown) is provided in the housing 10, the hydrogen detector can detect hydrogen leaking from the hydrogen storage part 30, the fuel cell stack 40, or a pipe connecting the hydrogen storage part 30 and the fuel cell stack 40 (hereinafter, also referred to as leaked hydrogen) distinguishingly from the released hydrogen. That is, it is considered that the released hydrogen is quickly discharged to the outside of the housing 10 from the ventilation hole 16 or the like without being detected by the hydrogen detector. On the other hand, it is considered that leaked hydrogen from the fuel cell stack 40 or the pipe connecting the hydrogen storage part 30 and the fuel cell stack 40 is detected by the hydrogen detector since the leaked hydrogen stays at least temporarily in the housing 10. Therefore, by adopting a configuration in which released hydrogen is quickly discharged to the outside of the housing 10, when a hydrogen detector is provided in the housing 10, the hydrogen detector can detect leaked hydrogen distinguishingly from the released hydrogen (in other words, only the leaked hydrogen can be detected).

The fuel cell stack 40 generates electric power by causing a chemical reaction between hydrogen supplied from the hydrogen storage part 30 and oxygen in the air. The electric power generated by the fuel cell stack 40 is output from an output terminal (not shown) provided in the fuel cell stack 40, and is supplied to the electric-power storage unit 50 via a wiring (not shown) or the like. The electric power generated by the fuel cell stack 40 may be output to the outside of the fuel cell system 1 via the input/output unit 19.

The fuel cell stack 40 is disposed behind the hydrogen storage part 30 in the housing 10. In addition, a connection portion of the fuel cell stack 40 connecting with the pipe is provided on one side surface side (the left side surface side in the present embodiment) in a top view of the housing 10. Accordingly, to be schematically illustrated, the pipe connecting the hydrogen storage part 30 (the supply/discharge hole 31) and the fuel cell stack 40, that is, a hydrogen passing route from the hydrogen storage part 30 to the fuel cell stack 40 is directed from the front side to the rear side, as indicated by an arrow X1 in FIG. 2, at a position close to the left side in the housing 10.

In addition, the output terminal provided in the fuel cell stack 40 is provided on the other side surface side (the right side surface side in the present embodiment) in a top view of the housing 10. Therefore, to be schematically illustrated, a conversion route from hydrogen to electric power by the fuel cell stack 40 is directed from the left side to the right side, as indicated by an arrow X2 in FIG. 2, at a position close to the rear side in the housing 10. Here, the conversion route from hydrogen to electric power by the fuel cell stack 40 is, for example, a line segment that connects a) the connection portion of the fuel cell stack 40 connecting with the pipe and b) the output terminal provided in the fuel cell stack 40.

The electric-power storage unit 50 stores electric power supplied from the fuel cell stack 40. The electric-power storage unit 50 is implemented by, for example, any type of secondary battery such as a lithium ion battery, a nickel hydrogen battery, or a lead storage battery. The electric power stored in the electric-power storage unit 50 can be output to the outside of the fuel cell system 1 via the input/output unit 19.

As illustrated in FIGS. 3 to 5, the electric-power storage unit 50 is disposed on the lower surface portion (bottom surface) of the housing 10. In the housing 10, an upper surface portion of the electric-power storage unit 50 is located at a position lower than the hydrogen storage part 30 (the supply/discharge hole 31), the fuel cell stack 40, and the pipe connecting the hydrogen storage part 30 and the fuel cell stack 40. In other words, in the housing 10, the hydrogen storage part 30 (the supply/discharge hole 31), the fuel cell stack 40, and the pipe connecting the hydrogen storage part 30 and the fuel cell stack 40 are provided at positions higher than the upper surface portion of the electric-power storage unit 50.

As described, by providing the components, such as the supply/discharge hole 31, the fuel cell stack 40, and the pipe connecting the supply/discharge hole 31 and the fuel cell stack 40, from which hydrogen may leak, at positions higher than the upper surface portion of the electric-power storage unit 50, even if hydrogen leaks from these components, it is possible to suppress the hydrogen from flowing toward the electric-power storage unit 50. That is, hydrogen having a lower specific gravity than air goes upward (that is, in a direction opposite to the electric-power storage unit 50) even if the hydrogen leaks from the above-described components. Therefore, by disposing the components from which hydrogen may leak above the electric-power storage unit 50, even if hydrogen leaks from these components, the leaked hydrogen can be suppressed from flowing toward the electric-power storage unit 50, and the safety of the fuel cell system 1 can be improved.

In addition, a control unit 60 is further provided in the housing 10. The control unit 60 includes, for example, an electric-power conversion unit (not illustrated) including a DC/DC converter, an inverter, and the like, and a control device (not illustrated) including a microcomputer or the like that controls the electric-power conversion unit. The control unit 60 is electrically connected to, for example, the electric-power storage unit 50 and the input/output unit 19, converts electric power output from the electric-power storage unit 50 into predetermined electric power (for example, an alternating current of 100V and 50 Hz), and supplies the converted electric power to the input/output unit 19. Accordingly, the fuel cell system 1 can output electric power, which is convenient for the user, from the input/output unit 19.

The control unit 60 may convert a plurality of types of electric power so as to be able to output a plurality of types of electric power such as high-voltage electric power and low-voltage electric power from the input/output unit 19. Accordingly, for example, low-voltage electric power can be output from electric-power supply holes 81 and 82, which will be described later, in the input/output unit 19, and high-voltage electric power can be output from an electric-power supply hole 83, which will be described later, in the input/output unit 19.

The control unit 60 is disposed in the housing 10, on the right side of the hydrogen storage part 30 and on the front side of the fuel cell stack 40. The input/output unit 19 is also provided close to the right side of the housing 10 so as to correspond to the control unit 60. Further, terminals, wiring, and the like for electrically connecting the control unit 60, the electric-power storage unit 50, and the input/output unit 19 are also provided close to the right side of the housing 10 so as to correspond to the control unit 60. Therefore, to be schematically illustrated, an electric-power passing route in the housing 10 is directed from the rear side to the front side at a position close to the right side in the housing 10, as indicated by an arrow X3 in FIG. 2.

That is, the components of the fuel cell system 1 are disposed in the housing 10 such that the hydrogen passing route X1, the conversion route X2 from hydrogen to electric power, and the electric-power passing route X3 substantially form a U-shape in a top view of the housing 10. Accordingly, a component handling hydrogen (that is, a component from which hydrogen may leak) and a component handling electricity can be disposed apart from each other in the housing 10, and even if hydrogen leaks from the component handling hydrogen, the leaked hydrogen can be prevented from flowing toward the component handling electricity.

That is, in the present embodiment, components handling hydrogen, such as the supply/discharge hole 31, the pipe connecting the hydrogen storage part 30 and the fuel cell stack 40, and the connection portion of the fuel cell stack 40 connecting with the pipe, are provided in a hydrogen utilization area A1 (see FIG. 2) on the left side in a top view of the housing 10. On the other hand, components handling electricity, such as the input/output unit 19, the control unit 60, and terminals and wiring for electrically connecting the control unit 60, the electric-power storage unit 50, and the input/output unit 19, are provided in an electricity utilization area A2 (see FIG. 2) on the right side in a top view of the housing 10. In this way, by dividing the areas (regions) in which the components handling hydrogen and the components handling electricity are disposed, the components handling hydrogen and the components handling electricity can be disposed separately in the housing 10, and even if hydrogen leaks from the components handling hydrogen, the leaked hydrogen can be suppressed from flowing toward the components handling electricity, and the safety of the fuel cell system 1 can be improved.

In the housing 10, air supply devices 21 and 22 are provided at positions facing the above-described ventilation hole 16 (ventilation hole provided in the upper surface portion of the main body 11) in an up-down direction. Each of the air supply devices 21 and 22 is, for example, an electric fan having an impeller that is rotationally driven in response to supply of electric power. With rotation of the impeller, the air supply devices 21 and 22 blow air in the housing 10 to the outside of the housing 10 through the ventilation hole 16. With the air supply devices 21 and 22, it is possible to facilitate taking-in of air into the housing 10 from the ventilation hole 14 to discharge air in the housing 10 from the ventilation hole 16, thereby improving air permeability between the inside and the outside of the housing 10.

In addition, according to the air supply devices 21 and 22, since the air permeability between the inside and the outside of the housing 10 can be improved, it is possible to quickly discharge, to the outside of the housing 10, the released hydrogen generated at the time of filling hydrogen into the hydrogen storage part 30, and hydrogen leaked from the hydrogen storage part 30, the above-described pipe, or the like, and it is possible to suppress the hydrogen from staying in the housing 10 and flowing toward the electric-power storage unit 50. Accordingly, the safety of the fuel cell system 1 can be improved. That is, since the specific gravity of the hydrogen leaked into the housing 10 is smaller than that of the air, the hydrogen rises in the housing 10. Therefore, by providing the air supply devices 21 and 22 so as to face the ventilation hole 16 in the upper surface portion of the main body 11, it is possible to quickly discharge the hydrogen rising in the housing 10 to the outside of the housing 10 through the ventilation hole 16.

As illustrated in FIG. 3, the air supply device 21 is provided at a position facing the supply/discharge hole 31 in the up-down direction. In other words, the air supply device 21 is provided at a position overlapping the supply/discharge hole 31 in a top view of the housing 10. Accordingly, the air supply device 21 can quickly discharge hydrogen, which leaks from the supply/discharge hole 31 and rises upward, to the outside of the housing 10, and can improve the safety of the fuel cell system 1.

Figure 6:
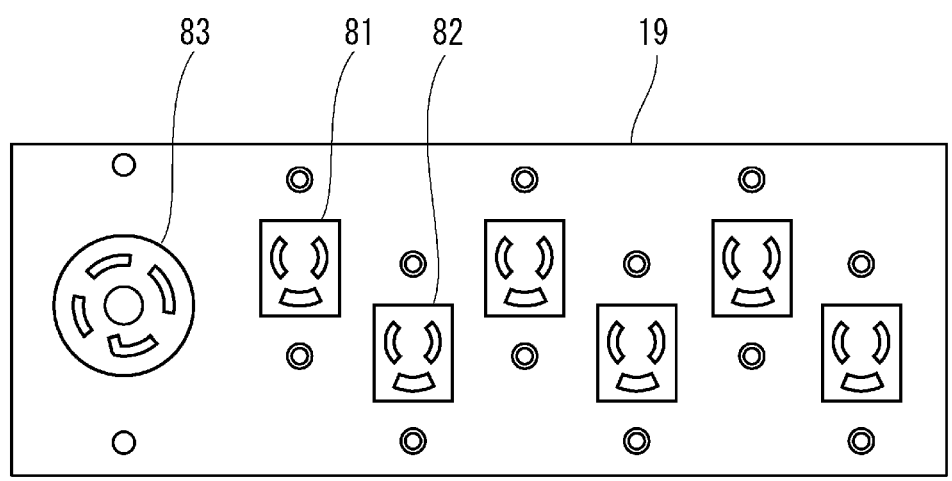
FIG. 6 is a front view of an input/output unit.

As illustrated in FIG. 6, the input/output unit 19 includes a plurality of electric-power supply holes such as electric-power supply holes 81, 82, and 83. In the input/output unit 19, the electric-power supply holes 81 and 82 and electric-power supply holes having the same shape as the electric-power supply holes 81 and 82 are electric-power supply holes (hereinafter, also referred to as low-voltage power supply holes) used for inputting and outputting low-voltage electric power of, for example, about 100V. The plurality of low-voltage electric-power supply holes provided in the input/output unit 19 are alternately arranged in the up-down direction and a horizontal direction. Accordingly, for example, even when a large-sized adapter such as an AC adapter is inserted into one low-voltage electric-power supply hole, it is possible to prevent the one low-voltage electric-power supply hole from interfering with adjacent low-voltage electric-power supply hole. Therefore, a plurality of devices can be connected to the fuel cell system 1 at the same time, and convenience provided by the fuel cell system 1 can be improved. The low-voltage electric-power supply holes such as the electric-power supply holes 81 and 82 are used, for example, when connecting the fuel cell system 1 and an electronic device 150 to be described later.

In the input/output unit 19, the electric-power supply hole 83 is an electric-power supply hole (hereinafter, also referred to as a high-voltage electric-power supply hole) used for inputting and outputting high-voltage electric power of, for example, 200V. The electric-power supply hole 83 (that is, the high-voltage electric-power supply hole) is used, for example, when connecting the fuel cell system 1 and a vehicle 100 to be described later.

(Example of Utilization of Fuel Cell System)

Figure 7:
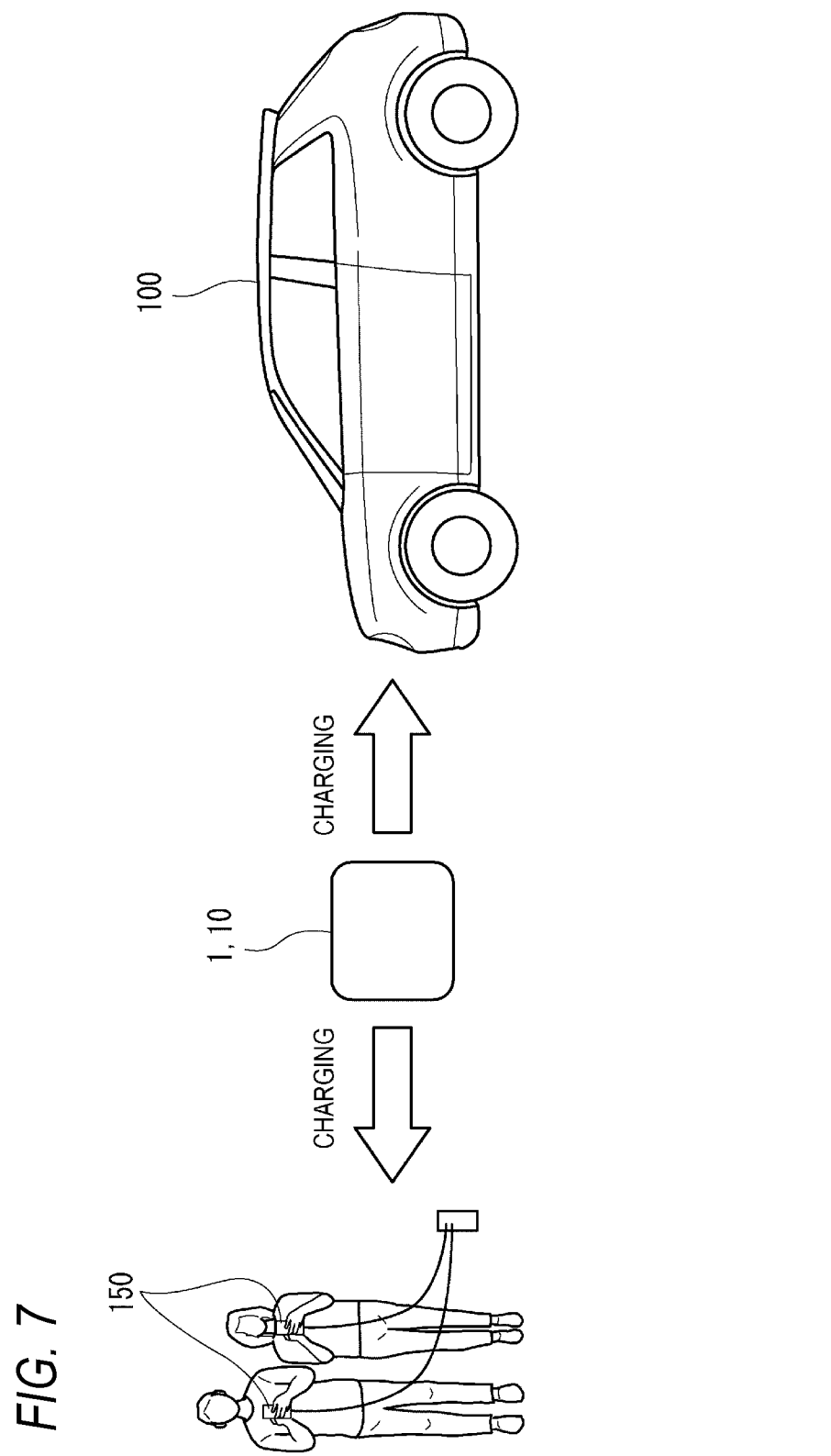
FIG. 7 is a schematic diagram illustrating a state where an electronic device and a vehicle are charged by the fuel cell system.

Next, an example of utilization of the fuel cell system 1 will be described. The fuel cell system 1 can supply electric power to an external device connected to the input/output unit 19. As illustrated in FIG. 7, the fuel cell system 1 can be connected to, for example, the vehicle 100. Here, the vehicle 100 is, for example, a hybrid electric vehicle or an electric vehicle. That is, the vehicle 100 includes a drive device (for example, see reference sign 110 in FIG. 11) that performs driving in response to supply of electric power, and a battery (for example, see reference sign 120 in FIG. 11) that can supply electric power to the drive device. The vehicle 100 travels by driving of the drive device.

When the fuel cell system 1 is connected to the vehicle 100, the fuel cell system 1 supplies, to the vehicle 100, electric power for driving the drive device of the vehicle 100 and electric power for charging the battery of the vehicle 100. The fuel cell system 1 can be connected to the electronic device 150 of a user. Here, the electronic device 150 is an electronic device including a battery, such as a smartphone. When the fuel cell system 1 is connected to the electronic device 150, the fuel cell system 1 supplies electric power for charging the battery of the electronic device 150 to the electronic device 150. According to such a fuel cell system 1, for example, it is also useful for ensuring power supply in an emergency such as when a disaster occurs.

Figure 8:
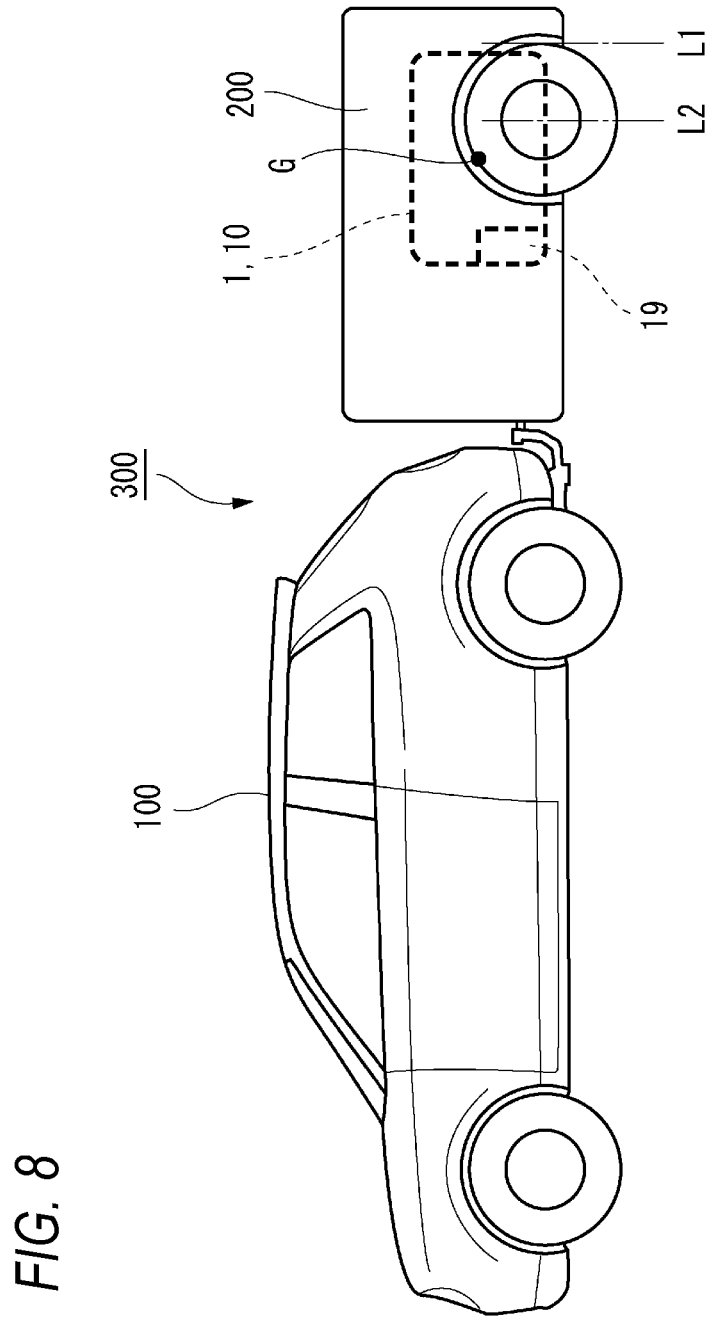
FIG. 8 is a schematic diagram of a moving body in which a vehicle serving as a towing portion and a trailer serving as a towed portion are connected.

Further, as illustrated in FIG. 8, the fuel cell system 1 can be mounted on a moving body 300 and be used. The moving body 300 includes the vehicle 100 and a trailer 200 towed by the vehicle 100. The vehicle 100 is an example of a towing portion in the present invention, and the trailer 200 is an example of a non-towing portion in the present invention.

The fuel cell system 1 (housing 10) mounted on the trailer 200 is electrically connected to the vehicle 100, and supplies, to the vehicle 100, electric power for driving the drive device of the vehicle 100 and electric power for charging the battery of the vehicle 100. Accordingly, the fuel cell system 1 can function as a range extender of the vehicle 100.

As illustrated in FIG. 8, in a state where the fuel cell system 1 is mounted on the trailer 200, the fuel cell system 1 (the housing 10) is disposed such that a side surface portion (that is, a front surface portion) provided with the input/output unit 19 faces the vehicle 100 side. Accordingly, not only mechanical connection between the vehicle 100 and the trailer 200 (connection for towing the trailer 200 by the vehicle 100) but also a wiring distance between the vehicle 100 and the fuel cell system 1 can be shortened, and electrical connection between the vehicle 100 and the fuel cell system 1 can be easily performed. Further, in this way, it is also possible to efficiently cool the fuel cell system 1 by effectively using air during movement (traveling) of the moving body 300.

In addition, in a state where the fuel cell system 1 is mounted on the trailer 200, the fuel cell system 1 (the housing 10) is disposed at a position on the vehicle 100 side relative to a rear end portion of a wheel provided in the trailer 200 (see a virtual line L1). Accordingly, since the housing 10 is disposed on a front side relative to the rear end portion of the wheel of the trailer 200, when a rear-end collision with the trailer 200 is caused by a vehicle or the like traveling behind the vehicle 100, the housing 10 can be protected by the wheel (for example, a tire) of the trailer 200, and damage to the housing 10 can be suppressed.

A center of gravity G of the fuel cell system 1 (the housing 10) is disposed on the vehicle 100 side relative to an axle of the trailer 200 (see a virtual line L2). Accordingly, since the center of gravity G is disposed close to a center of the moving body 300 in the front-rear direction, it is possible to improve stability during movement of the moving body 300.

Figure 9A:
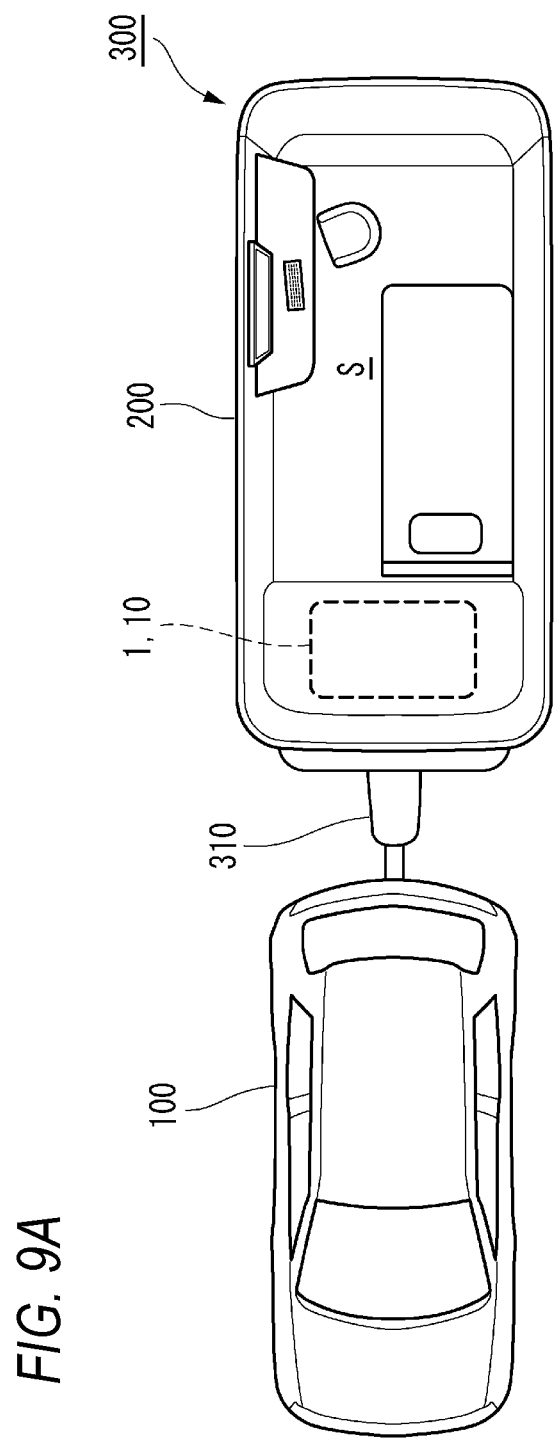
FIG. 9A is a schematic diagram of a moving body of another example, and is a top perspective view of the moving body.
Figure 9B:
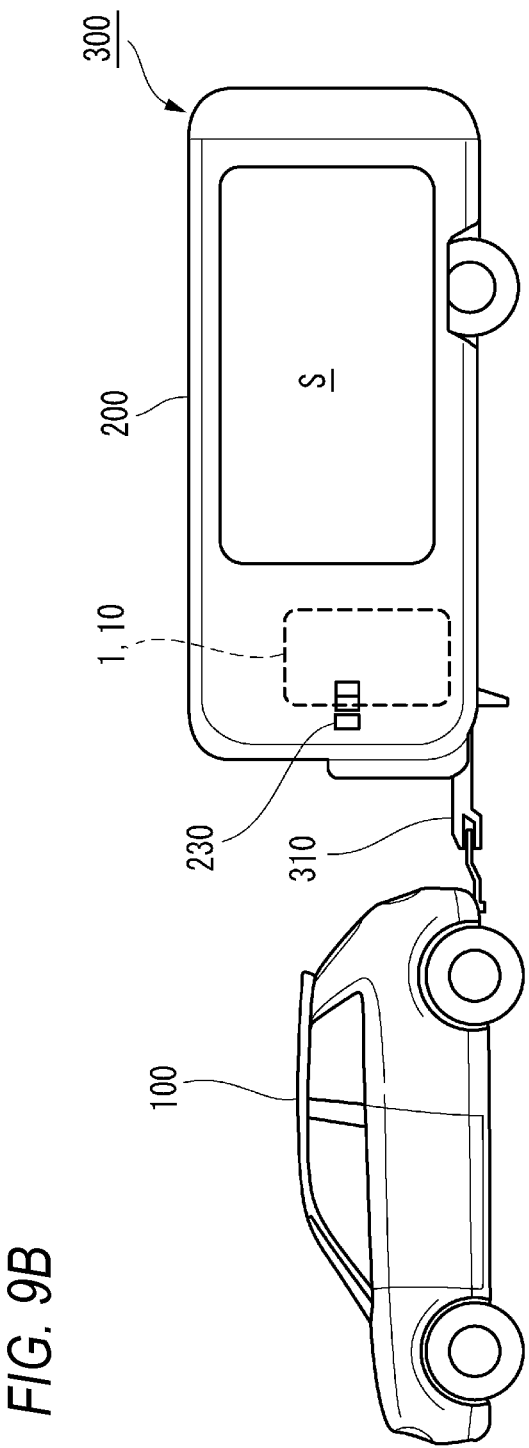
FIG. 9B is a schematic diagram of the moving body of the other example, and is a side view of the moving body.
Figure 10A:
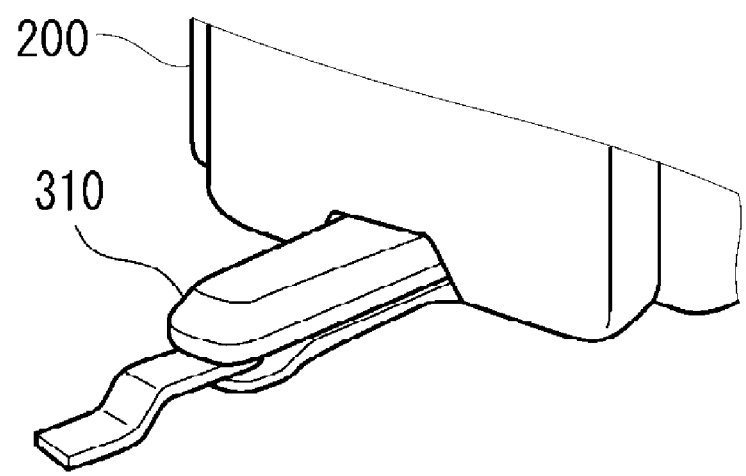
FIG. 10A is an enlarged view of a connection portion in the moving body of FIG. 9.
Figure 10B:
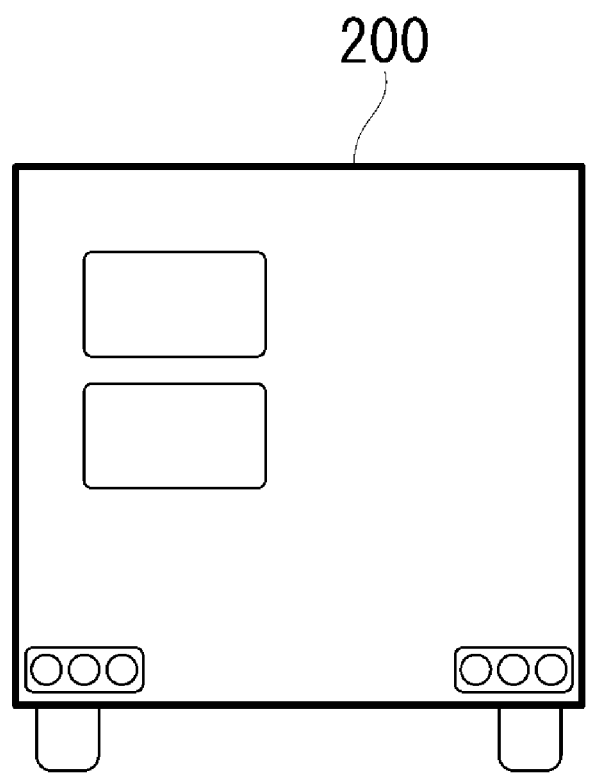
FIG. 10B is a rear view of a trailer in the moving body of FIG. 9.
Figure 10C:
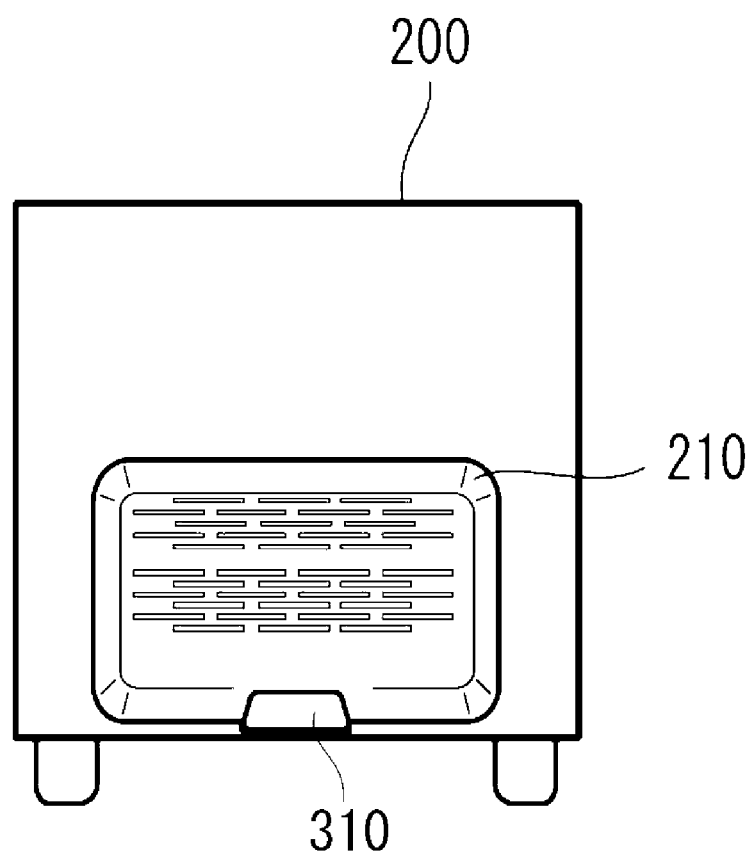
FIG. 10C is a front view of the trailer in a state where an attachment/detachment portion of the moving body of FIG. 9 is exposed.
Figure 10D:
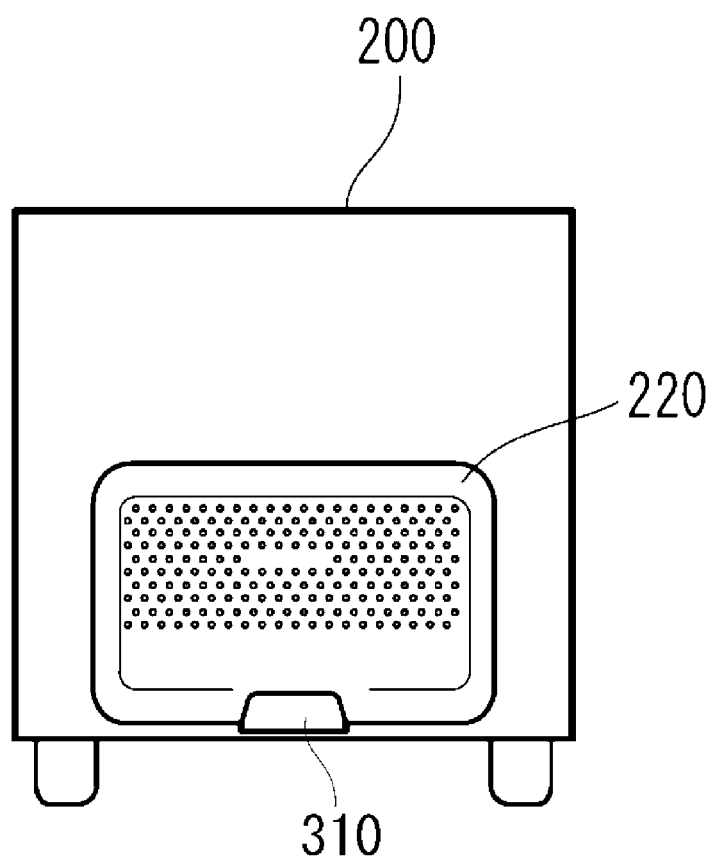
FIG. 10D is a front view of the trailer in a state where a cover member of the moving body of FIG. 9 is attached.

FIGS. 9A, 9B, and 10A to 10D show the moving body 300 of another example. Specifically. FIG. 9A is a top perspective view of the moving body, and FIG. 9B is a side view of the moving body. In addition, FIG. 10A is an enlarged view of a connection portion 310, FIG. 10B is a rear view of the trailer 200, FIG. 10C is a front view of the trailer 200 in a state where an attachment/detachment portion 210 is exposed, and FIG. 10D is a front view of the trailer 200 in a state where a cover member 220 is attached.

In the example illustrated in FIGS. 9A, 9B, and 10A to 10D, the trailer 200 includes a stay space S where a person can stay, in addition to a space (hereinafter, also referred to as a mounting space) for mounting the fuel cell system 1 (housing 10). In the trailer 200, the mounting space and the stay space S are defined and formed using a panel or the like so as to be independent spaces. That is, the housing 10 (the fuel cell system 1) is disposed outside the stay space S in the trailer 200. Accordingly, comfort provided by the stay space S can be improved.

In addition, in the example illustrated in FIGS. 9A, 9B, and 10A to 10D, the connection portion 310 (see FIG. 10A) and the attachment/detachment portion 210 (see FIG. 10C) are provided on a front surface portion of the trailer 200. Here, the front surface portion of the trailer 200 is a side surface portion of the trailer 200 that faces the vehicle 100 when the trailer 200 is towed by the vehicle 100.

The trailer 200 is mechanically connected to the vehicle 100 via the connection portion 310 so as to be towed by the vehicle 100. A connection cable 320 (see FIG. 11) that electrically connects the fuel cell system 1 mounted on the trailer 200 and the vehicle 100 is provided so as to extend from the trailer 200 toward the vehicle 100 along the connection portion 310. The connection cable 320 includes an electric-power supply line for supplying electric power of the fuel cell system 1 to the vehicle 100, a signal line for communicating between the fuel cell system 1 (for example, a control unit 90 to be described later) and the vehicle 100, and the like.

The attachment/detachment portion 210 defines and forms a mounting space, and is configured such that the housing 10 can be attached from the outside. For example, the attachment/detachment portion 210 is implemented with a panel or the like having a predetermined shape, and defines a mounting space recessed in a substantially rectangular parallelepiped shape from the front surface portion of the trailer 200 toward a rear side of the trailer 200. The housing 10 can be inserted into the mounting space defined and formed by the attachment/detachment portion 210 from a front side of the trailer 200 (that is, from the outside). By inserting the housing 10 into the mounting space, the housing 10 can be attached to the trailer 200. Therefore, the user can easily mount the housing 10 on the trailer 200 (that is, the moving body 300).

In addition, the attachment/detachment portion 210 (mounting space) can be covered with the cover member 220 (see FIG. 10D) from the front side of the trailer 200 (that is, from the vehicle 100 side) in a state where the housing 10 is attached. Accordingly, the housing 10 can be reliably attached to the attachment/detachment portion 210, and the housing 10 can be protected from foreign matters such as mud splashes and flying stones from the front side caused by the movement of the moving body 300.

In addition, in the example illustrated in FIGS. 9A, 9B, and 10A to 10D, a first electric-power supply unit 230 capable of supplying electric power to the outside is provided in a side surface portion (for example, a left side surface portion) of the trailer 200. The input/output unit 19 is configured to be electrically connected to the first electric-power supply unit 230 in a state where the housing 10 (the fuel cell system 1) is mounted on the trailer 200, so as to be able to supply electric power stored in the electric-power storage unit 50 or electric power generated by the fuel cell stack 40 to the outside via the first electric-power supply unit 230. Accordingly, even when the housing 10 (the fuel cell system 1) is mounted on the trailer 200, the electric power of the fuel cell system 1 can be easily supplied to the outside via the first electric-power supply unit 230, and convenience provided by the fuel cell system 1 can be improved.

A second electric-power supply unit (not shown) that supplies electric power to the stay space S is also provided inside the trailer 200. The input/output unit 19 is configured to be electrically connected to the second electric-power supply unit in a state where the housing 10 (the fuel cell system 1) is mounted on the trailer 200, so as to be able to supply the electric power stored in the electric-power storage unit 50 or the electric power generated by the fuel cell stack 40 to the stay space S via the second electric-power supply unit. Accordingly, even in a state where the housing 10 (the fuel cell system 1) is mounted on the trailer 200, the electric power of the fuel cell system 1 can be supplied to a device (for example, the electronic device 150) in the stay space S via the second electric-power supply unit, and the convenience provided by the fuel cell system 1 can be improved.

The input/output unit 19 may be electrically connected to the second electric-power supply unit and at least one of the vehicle 100 and the first electric-power supply unit 230 in a state where the housing 10 is mounted on the trailer 200. Further, the input/output unit 19 may be configured to be able to supply the electric power stored in the electric-power storage unit 50 or the electric power generated by the fuel cell stack 40, to the second electric-power supply unit and at least one of the vehicle 100 and the first electric-power supply unit 230 connected thereto. Accordingly, the electric power of the fuel cell system 1 can be used at the same time by a device connected to the vehicle 100 or the first electric-power supply unit 230 and a device connected to the second electric-power supply unit, and the convenience provided by the fuel cell system 1 can be further improved.

In addition, a storage part (not shown) that stores generated water generated by electric power generation of the fuel cell stack 40 and can supply the stored generated water to the trailer 200 may be further provided in the housing 10. This makes it possible to use the water in the trailer 200, which is generated as a byproduct at the time of electric power generation of the fuel cell stack 40. The storage part may be connected to a pipeline (not shown) connected to the stay space S so as to be able to supply the stored generated water to the stay space S via the pipeline. Accordingly, water can be supplied to the stay space S where a person stays, and convenience for the user who stays in the stay space S can be improved.

In addition, the storage part may convert water vapor generated by electric power generation of the fuel cell stack 40 into water droplets, recover and purify the water droplets, and supply the purified water to the trailer 200 (stay space S) as generated water. Accordingly, it is possible to supply clean water that is convenient for the user, and it is possible to improve the convenience for the user who stays in the stay space S.

(Functional Configuration of Moving Body)

Figure 11:
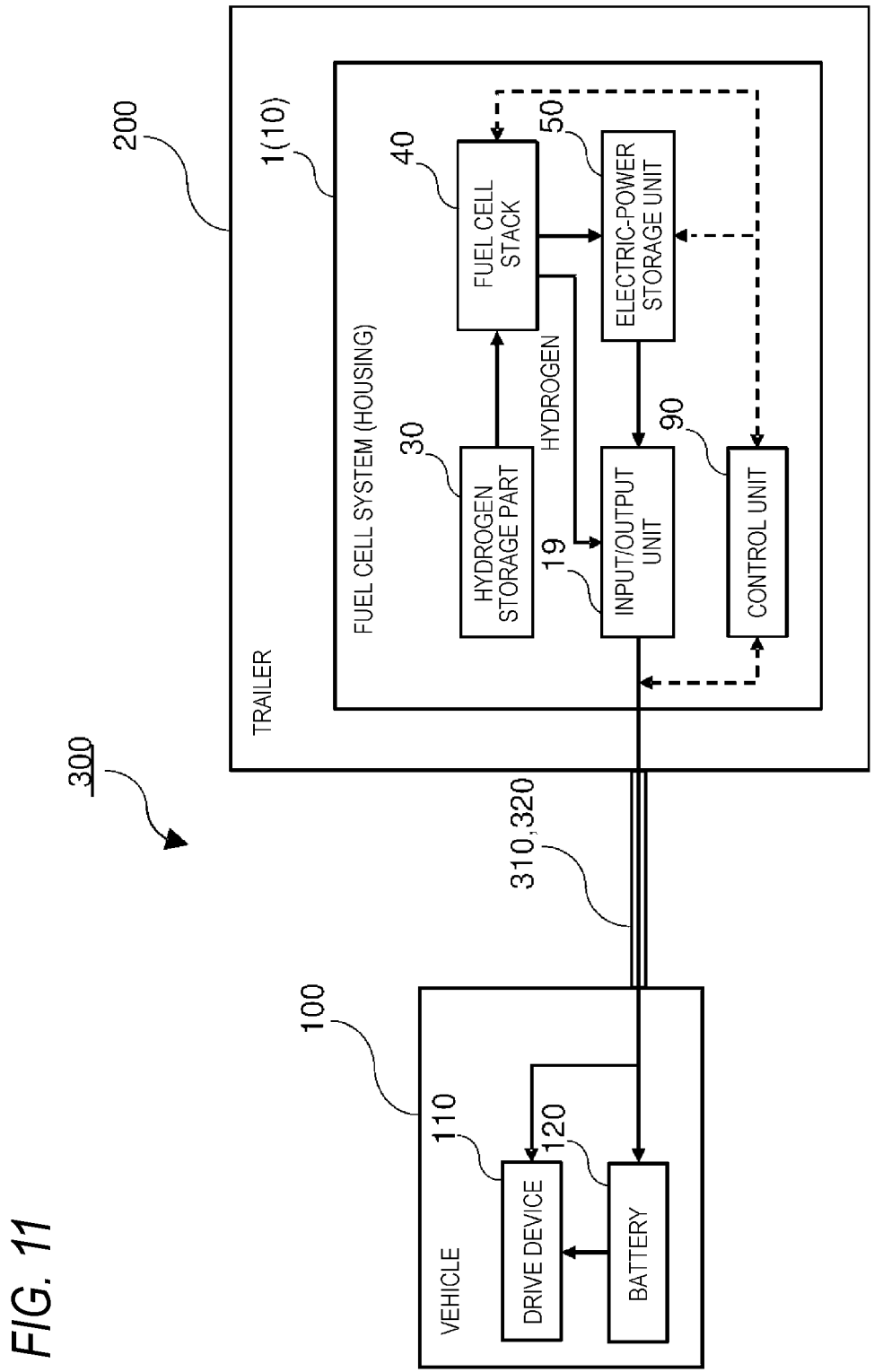
FIG. 11 is a block diagram illustrating an example of a functional configuration of the moving body according to the present embodiment.

Next, an example of a functional configuration of the moving body 300 will be described with reference to FIG. 11. As illustrated in FIG. 11, the fuel cell system 1 mounted on the trailer 200 of the moving body 300 includes the control unit 90 in addition to the hydrogen storage part 30, the fuel cell stack 40, the electric-power storage unit 50, and the input/output unit 19 described above.

The control unit 90 is provided in the control unit 60 described above, and is implemented with, for example, an electronic control unit (ECU). The ECU includes a processor that performs various calculations, a storage device that stores various types of information, an input/output device that controls input/output of data between an inside and an outside of the control unit 90, and the like. As indicated by dashed arrows in FIG. 11, the control unit 90 can control electric power generation of the fuel cell stack 40 and charging and discharging of the electric-power storage unit 50, and can also communicate with the vehicle 100 via the connection cable 320.

Here, the vehicle 100 is a hybrid electric vehicle, an electric vehicle, or the like, and includes a drive device 110 that is implemented with a drive motor or the like that is driven in response to supply of electric power, and a battery 120 that can supply electric power to the drive device 110. The vehicle 100 can travel by driving of the drive device 110. The vehicle 100 derives a remaining amount (for example, State Of Charge (SOC)) of the battery 120 from an output of the battery 120 detected by a battery sensor (not shown), and transmits remaining amount information indicating the derived remaining amount of the battery 120 to the control unit 90 via the connection cable 320.

The control unit 90 controls supply of electric power from the fuel cell system 1 to the vehicle 100 based on the remaining amount information acquired from the vehicle 100. Accordingly, even if the remaining amount of the battery 120 decreases, the electric power required in the vehicle 100 can be secured by the electric power of the fuel cell system 1. Therefore, the convenience of the vehicle 100 can be improved.

For example, when the control unit 90 detects that the remaining amount of the battery 120 is equal to or less than a threshold based on the remaining amount information acquired from the vehicle 100, the control unit 90 starts supply of electric power from the fuel cell system 1 to the battery 120. Accordingly, when the electric power of the battery 120 decreases as the vehicle 100 travels, the electric power of the fuel cell system 1 can be supplied to the battery 120 to charge the battery 120. Therefore, a distance the vehicle 100 can cover with the electric power of the battery 120 can be increased.

When the control unit 90 detects that the remaining amount of the battery 120 is equal to or less than the threshold based on the remaining amount information acquired from the vehicle 10, the control unit 90 may start supply of electric power from the fuel cell system 1 to the drive device 110. That is, the control unit 90 may directly supply electric power from the fuel cell system 1 to the drive device 110. Accordingly, even if the remaining amount of the battery 120 decreases, electric power required by the drive device 110 (for example, the electric power required for the drive device 110 to cause the vehicle 100 to travel) can be secured by the electric power of the fuel cell system 1.

When supplying electric power from the fuel cell system 1 to the vehicle 100, the control unit 90 first supplies electric power of the electric-power storage unit 50 to the vehicle 100. The electric power of the electric-power storage unit 50 supplied to the vehicle 100 is supplied to, for example, the drive device 110 for driving. That is, the control unit 90 may supply the electric power of the electric-power storage unit 50 to the drive device 110 when starting supply of electric power to the vehicle 100. Accordingly, the electric power required by the drive device 110 can be secured by the electric power of the electric-power storage unit 50. In addition, when there is surplus electric power in the electric power that can be output from the electric-power storage unit 50 after supply of electric power to the drive device 110 is performed, the control unit 90 may supply the surplus electric power to the battery 120 to charge the battery 120. Accordingly, the battery 120 is charged by the electric power of the electric-power storage unit 50, and the distance the vehicle 100 can cover with the electric power of the battery 120 can be increased. The electric power of the electric-power storage unit 50 is supplied to the vehicle 100 via the input/output unit 19 and the connection cable 320.

Thereafter, when a remaining amount of the electric-power storage unit 50 is equal to or less than a predetermined threshold, the control unit 90 causes the fuel cell stack 40 to start electric power generation. Accordingly, even after the remaining amount of the electric-power storage unit 50 is low, the supply of electric power to the vehicle 100 can be continued with the electric power generated by the fuel cell stack 40.

In addition, the control unit 90 supplies the electric power generated by the fuel cell stack 40 in accordance with a predetermined priority order. Specifically, when it is necessary to supply electric power generated by the fuel cell stack 40 to the drive device 110 in order to maintain driving of the vehicle 100, the control unit 90 first gives a highest priority to supply of electric power to the drive device 110. Accordingly, the electric power required by the drive device 110 can be secured with the electric power generated by the fuel cell stack 40.

Then, only when there is surplus electric power after supply of electric power to the drive device 110 is performed, the control unit 90 supplies the electric power generated by the fuel cell stack 40 to the battery 120 and the electric-power storage unit 50. At this time, the control unit 90 preferentially supplies electric power to the battery 120 over the electric-power storage unit 50. That is, the control unit 90 first charges the battery 120, and when the remaining amount of the battery 120 reaches a predetermined value (for example, a fully charged state) and the charging of the battery 120 is completed, the control unit 90 charges the electric-power storage unit 50. This makes it possible to charge the battery 120 at an early stage. Therefore, the distance the vehicle 100 can cover with the electric power of the battery 120, that is, the distance the vehicle 100 alone can cover can be recovered at an early stage, and the convenience for the user of the vehicle 100 can be improved.

In addition, after charging of the electric-power storage unit 50 and the battery 120 by the electric power generated by the fuel cell stack 40 is completed, that is, after the remaining amounts of the electric-power storage unit 50 and the battery 120 reach a predetermined value, the control unit 90 may cause the fuel cell stack 40 to continue the electric power generation and supply the generated electric power to the drive device 110. Accordingly, the driving of the drive device 110 can be maintained without consuming the electric power of the battery 120. Therefore, it is possible to cause the vehicle 100 to travel while maintaining the distance the vehicle 100 can cover with the electric power of the battery 120, that is, the distance the vehicle 100 alone can cover, and it is possible to improve convenience for the user of the vehicle 100.

When the hydrogen in the hydrogen storage part 30 runs out as a result of continuing the electric power generation performed by the fuel cell stack 40, the control unit 90 may subsequently supply the electric power of the electric-power storage unit 50 to the drive device 110. Accordingly, the driving of the vehicle 100 by the drive device 110 can be maintained without consuming the electric power of the battery 120. Therefore, it is possible to cause the vehicle 100 to travel while maintaining the distance the vehicle 100 can cover with the electric power of the battery 120, that is, the distance the vehicle 100 alone can cover, and it is possible to improve the convenience for the user of the vehicle 100.

For example, when an ignition power supply (power supply for driving the drive device 110, which is also referred to as an IG power supply hereinafter) of the vehicle 100 is off, the control unit 90 stops the electric power generation performed by the fuel cell stack 40. Accordingly, when the driving of the vehicle 100 by the drive device 110 is ended, the electric power generation performed by the fuel cell stack 40 is stopped, and the consumption of hydrogen can be suppressed.

When the remaining amount of the electric-power storage unit 50 is equal to or less than the threshold after the electric power generation performed by the fuel cell stack 40 is stopped, the control unit 90 may restart the electric power generation performed by the fuel cell stack 40 to charge the electric-power storage unit 50. Accordingly, even after the electric power generation performed by the fuel cell stack 40 is temporarily stopped, when the electric power of the electric-power storage unit 50 decreases, the electric power generation of the fuel cell stack 40 can be restarted, and the electric-power storage unit 50 can be charged.

(Control Method for Fuel Cell System)

Figure 12:
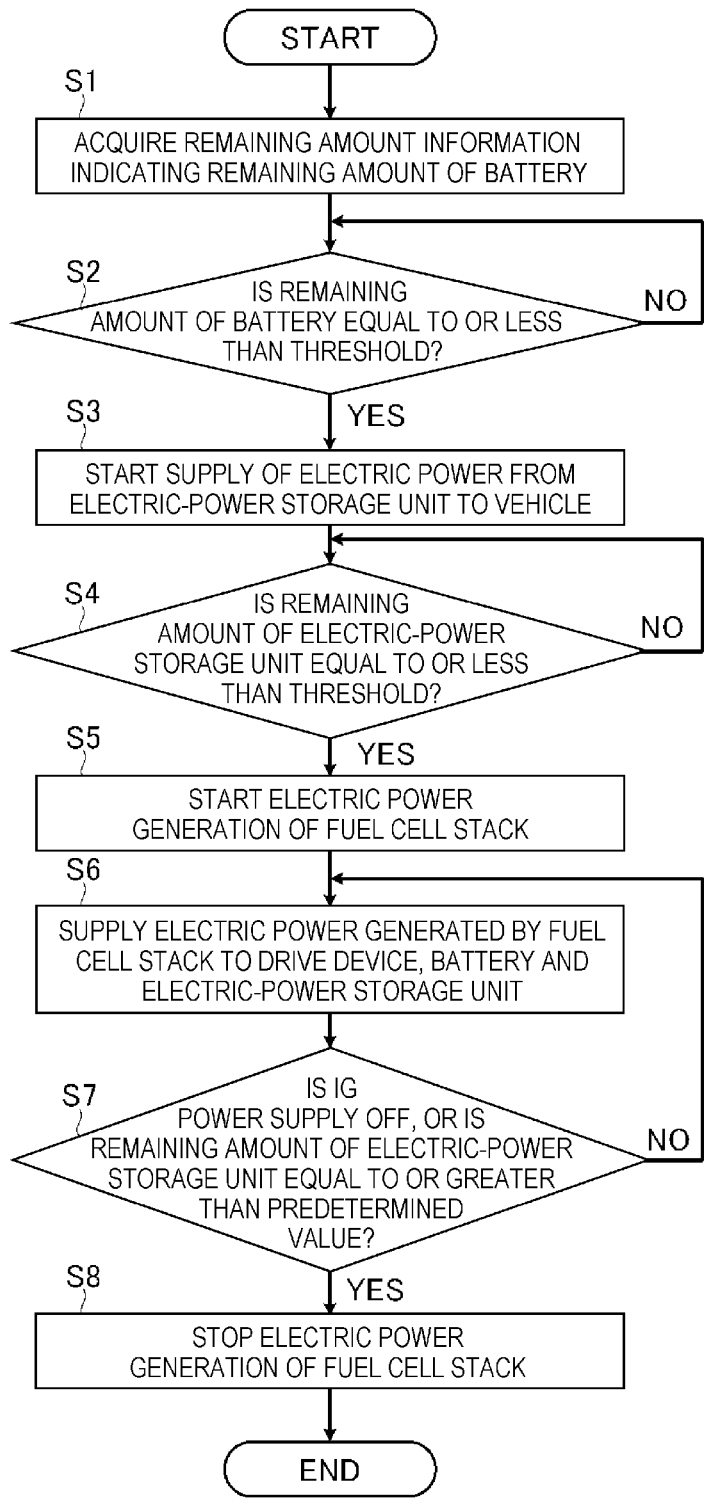
FIG. 12 is a flowchart illustrating an example of a control method for the fuel cell system according to the present embodiment.

Next, an example of a control method for the fuel cell system 1 will be described with reference to FIG. 12. This control method can be implemented, for example, by a processor of the ECU implementing the control unit 90 executing a program stored in advance in a storage device or the like.

At a predetermined timing including one during moving of the moving body 300 (that is, during traveling of the vehicle 100), the control unit 90 acquires remaining amount information indicating a remaining amount of the battery 120 from the vehicle 100 (step S1). Then, the control unit 90 determines whether the remaining amount of the battery 120 is equal to or less than a threshold based on the acquired remaining amount information (step S2). When the remaining amount of the battery 120 is sufficient (step S2: NO), the control unit 90 returns to step S1.

On the other hand, when the remaining amount of the battery 120 is equal to or less than the threshold (step S2: YES), the control unit 90 starts supply of electric power from the electric-power storage unit 50 to the vehicle 100 (step S3). Then, the control unit 90 determines whether a remaining amount of the electric-power storage unit 50 is equal to or less than a threshold (step S4). When the remaining amount of the electric-power storage unit 50 is sufficient (step S4: NO), the control unit 90 continues the supply of electric power from the electric-power storage unit 50 to the vehicle 100.

On the other hand, when the remaining amount of the electric-power storage unit 50 is equal to or less than the threshold (step S4: YES), the control unit 90 causes the fuel cell stack 40 to start electric power generation (step S5). Then, the control unit 90 supplies the electric power generated by the fuel cell stack 40 to the drive device 110, the battery 120, and the electric-power storage unit 50 (step S6). At this time, as described above, the control unit 90 preferentially supplies the electric power generated by the fuel cell stack 40 in an order of the drive device 110>the battery 120>the electric-power storage unit 50.

Next, the control unit 90 determines whether the IG power supply of the vehicle 100 is turned off or a remaining amount of the electric-power storage unit 50 is equal to or greater than a predetermined value (for example, the electric-power storage unit 50 is in a fully charged state) (step S7). When a negative determination is made in step S7 (step S7: NO), the control unit 90 returns to step S6. In this case, the electric power generation performed by the fuel cell stack 40 is continued. On the other hand, when an affirmative determination is made in step S7 (step S7: YES), the control unit 90 stops the electric power generation performed by the fuel cell stack 40 (step S8), and ends the series of processing.

As described above, when the remaining amount of the electric-power storage unit 50 is equal to or less than the threshold after the electric power generation performed by the fuel cell stack 40 is stopped, the control unit 90 may restart the electric power generation performed by the fuel cell stack 40 and charge the electric-power storage unit 50 with the electric power generated by the fuel cell stack 40.

(Specific Example of Electric Power Supply by Fuel Cell System)

Next, a specific example of electric power supply by the fuel cell system 1 will be described with reference to FIG. 13. In the following description of FIG. 13, the same components as those described above with reference to FIG. 11 are denoted by the same reference signs, and a description thereof is omitted as appropriate.

In the example illustrated in FIG. 13, the fuel cell system 1 is mounted on the trailer 200 towed by the vehicle 100, and is electrically connected to the vehicle 100. That is, the fuel cell system 1 can supply electric power to the vehicle 100.

(a) of FIG. 13 illustrates a remaining amount of hydrogen stored in the hydrogen storage part 30 of the fuel cell system 1 (shown as hydrogen remaining amount). (b) of FIG. 13 illustrates a remaining amount of the battery 120 of the vehicle 100 (shown as the battery remaining amount). (c) of FIG. 13 illustrates presence or absence (on/off) of electric power generation performed by the fuel cell stack 40 of the fuel cell system 1 (shown as FC electric power generation). (d) of FIG. 13 illustrates an electric-power source (shown as a load) of electric power supplied to the drive device 110 of the vehicle 100, and specifically, "BAT" indicates the battery 120, and "FC" indicates the fuel cell stack 40.

In a period from a time point t0 to a time point t1 shown in FIG. 13, the vehicle 100 is traveling by supplying the electric power of the battery 120 to the drive device 110. Therefore, in this period, the remaining amount of the battery 120 gradually decreases.

At the time point t1 shown in FIG. 13, it is assumed that the remaining amount of the battery 120 reaches a threshold Th. Here, the threshold Th is a threshold serving as a condition for starting supply of electric power from the fuel cell system 1 to the vehicle 100. Although illustration is omitted, it is assumed that a remaining amount (not shown) of the electric-power storage unit 50 of the fuel cell system 1 is also equal to or less than a threshold at the time point t1.

In this case, the control unit 90 starts the electric power generation performed by the fuel cell stack 40 from the time point t1, and supplies the electric power generated by the fuel cell stack 40 to the vehicle 100. The electric power generated by the fuel cell stack 40 and supplied to the vehicle 100 is used for driving the drive device 110 (that is, traveling of the vehicle 100) and charging the battery 120.

Then, at a time point t2 after the time point t1, it is assumed that the remaining amount of the battery 120 is equal to or greater than a predetermined value (for example, an SOC of the battery 120 is 100%) and the charging of the battery 120 is completed. However, for example, until a predetermined time point t3 is reached, the control unit 90 continues the electric power generation performed by the fuel cell stack 40 and the supply of the generated electric power to the vehicle 100 even after the time point t2. Accordingly, the vehicle 100 can be caused to travel while maintaining the remaining amount of the battery 120 until the time point t3. Here, the time point t3 is, for example, a time point at which electrical connection between the fuel cell system 1 and the vehicle 100 is released. The time point t3 may be a time point at which the remaining amount of hydrogen stored in the hydrogen storage part 30 is equal to or less than the threshold. After the time point t3, the vehicle 100 travels by supplying the electric power of the battery 120 to the drive device 110 again.

It is assumed that the IG power supply of the vehicle 100 is turned off at a time point t4 between the time point t2 and the time point t3. In this case, as indicated by a thick broken line in FIG. 13, the control unit 90 ends the electric power generation performed by the fuel cell stack 40 at the time point t4. In this case, when the IG power supply of the vehicle 100 is turned on thereafter, the electric power of the battery 120 is supplied to the drive device 110, so that the vehicle 100 travels.

Although an embodiment of the present invention has been described above with reference to the accompanying drawings, it is needless to say that the present invention is not limited to the above-described embodiment. It will be apparent to those skilled in the art that various changes and modifications may be conceived within the scope of the claims. It is also understood that the various changes and modifications belong to the technical scope of the present invention. The components in the embodiments described above may be combined freely within a range not departing from the spirit of the invention.

In the present specification, at least the following matters are described. Although the corresponding components or the like in the above-described embodiment are illustrated in parentheses, the present invention is not limited thereto.

(1) A control method for a fuel cell system (fuel cell system 1), the fuel cell system including a hydrogen storage part (hydrogen storage part 30) that stores hydrogen and a fuel cell stack (fuel cell stack 40) that generates electric power using hydrogen supplied from the hydrogen storage part, the fuel cell system at least being capable of supplying electric power obtained by electric power generation of the fuel cell stack to an outside, and the fuel cell system being mounted on a towed portion (trailer 200) of a moving body (moving body 300) that includes the towed portion and a towing portion (vehicle 100), and being electrically connected to the towing portion, the towing portion including a battery (battery 120) and a drive device (110) performing driving in response to supply of electric power, and the towed portion being towed by the towing portion, the control method including:
acquiring remaining amount information indicating a remaining amount of the battery (step S1); and
starting supply of electric power to the towing portion (step S3) when it is determined that the remaining amount of the battery is equal to or less than a threshold based on the remaining amount information (step S2: YES).

According to (1), even when the remaining amount of the battery of the towing portion is low, electric power required in the towing portion can be secured with the electric power of the fuel cell system, and thus convenience for a user of the towing portion can be improved.

(2) The control method for a fuel cell system according to (1), the fuel cell system further including an electric-power storage unit (electric-power storage unit 50) that stores electric power obtained by electric power generation of the fuel cell stack or supply from an outside,
in which electric power of the electric-power storage unit is supplied to the drive device when supply of electric power to the battery is started.

According to (2), electric power required by the drive device can be secured with the electric power of the electric-power storage unit.

(3) The control method for a fuel cell system according to (2),
in which when a remaining amount of the electric-power storage unit is equal to or less than a threshold (step S4: YES), electric power generation performed by the fuel cell stack is started (step S5).

According to (3), even after the remaining amount of the power storage unit is low, the supply of electric power to the towing portion can be continued with the electric power generated by the fuel cell stack.

(4) The control method for a fuel cell system according to (3),
  in which the battery is charged with electric power generated by the fuel cell stack in preference to the electric-power storage unit.

According to (4), it is possible to charge the battery of the towing portion at an early stage.

(5) The control method for a fuel cell system according to (4),
  in which electric power generated by the fuel cell stack is supplied to the drive device (drive device 110) (step S6).

According to (5), the electric power required by the drive device can be secured with the electric power generated by the fuel cell stack.

(6) The control method for a fuel cell system according to (5),
  in which electric power generation performed by the fuel cell stack is continued even after the remaining amounts of the electric-power storage unit and the battery reach a predetermined value, and electric power generated by the fuel cell stack is supplied to the drive device.

According to (6), it is possible to maintain driving of the drive device without consuming the electric power of the battery.

(7) The control method for a fuel cell system according to (6),
  in which electric power generation performed by the fuel cell stack is stopped (step S8) when a power supply for driving the drive device is turned off (step S7: YES).

According to (7), when the driving of the drive device is ended, the electric power generation performed by the fuel cell stack can be stopped, and consumption of hydrogen can be suppressed.

(8) The control method for a fuel cell system according to (7),
  in which when the remaining amount of the electric-power storage unit is equal to or less than the threshold after electric power generation performed by the fuel cell stack is stopped, electric power generation performed by the fuel cell stack is started.

According to (8), even after the electric power generation performed by the fuel cell stack is temporarily stopped, when the electric power of the electric-power storage unit decreases, the electric power generation performed by the fuel cell stack can be restarted and the electric-power storage unit can be charged.

The invention claimed is:

1. A control method for a fuel cell system, the fuel cell system including a hydrogen storage part that stores hydrogen and a fuel cell stack that generates electric power using hydrogen supplied from the hydrogen storage part, the fuel cell system at least being capable of supplying electric power obtained by electric power generation of the fuel cell stack to an outside, the fuel cell system being mounted on a towed portion of a moving body that includes the towed portion and a towing portion, the fuel cell system being electrically connected to the towing portion, the towing portion including a battery and a drive device performing driving in response to supply of electric power, the towed portion being towed by the towing portion, the control method comprising:
  acquiring remaining amount information indicating a remaining amount of the battery; and
  starting supply of electric power directly to the drive device from the fuel cell system when it is determined that the remaining amount of the battery is equal to or less than a threshold based on the remaining amount information and that it is necessary to supply electric power to the drive device.

2. The control method for a fuel cell system according to claim 1, wherein:
  the fuel cell system further includes an electric-power storage unit that stores electric power obtained by electric power generation of the fuel cell stack or supply from an outside; and
  electric power of the electric-power storage unit is supplied to the drive device when supply of electric power to the towing portion is started.

3. The control method for a fuel cell system according to claim 2, wherein
  when a remaining amount of the electric-power storage unit is equal to or less than a threshold, electric power generation performed by the fuel cell stack is started.

4. The control method for a fuel cell system according to claim 3, wherein
  the battery is charged with electric power generated by the fuel cell stack in preference to the electric-power storage unit.

5. The control method for a fuel cell system according to claim 1, wherein
  electric power generation performed by the fuel cell stack is continued even after the remaining amounts of the electric-power storage unit and the battery reach a predetermined value, and electric power generated by the fuel cell stack is supplied to the drive device.

6. The control method for a fuel cell system according to claim 5, wherein
  electric power generation performed by the fuel cell stack is stopped when a power supply for driving the drive device is turned off.

7. The control method for a fuel cell system according to claim 6, wherein
  when the remaining amount of the electric-power storage unit is equal to or less than the threshold after electric power generation performed by the fuel cell stack is stopped, electric power generation performed by the fuel cell stack is started.

* * * * *